US005709738A

United States Patent [19]

Cronlund et al.

[11] Patent Number: 5,709,738

[45] Date of Patent: Jan. 20, 1998

[54] COATING COMPOSITION FOR INK JET PRINTING

[76] Inventors: Malcolm Cronlund, 8221 Old Post Rd. East, East Amherst, N.Y. 14251; William P. Subsara, 801 Stine Rd., Fremont, Ohio 43420

[21] Appl. No.: 659,433

[22] Filed: Jun. 6, 1996

[51] Int. Cl.$^6$ .......................... C09D 11/02; B41M 5/155

[52] U.S. Cl. .......................... 106/31.67; 106/31.71; 106/31.9; 503/210; 503/212; 503/216; 503/225

[58] Field of Search .......................... 106/31.67, 31.9, 106/31.71; 503/210, 212, 216, 225

[56] References Cited

U.S. PATENT DOCUMENTS

| | | | |
|---|---|---|---|
| 2,712,507 | 7/1955 | Green | 503/200 |
| 2,730,456 | 1/1956 | Green et al. | 503/214 |
| 3,455,721 | 7/1969 | Phillips et al. | 503/204 |
| 3,466,184 | 9/1969 | Bowler et al. | 503/200 |
| 3,672,935 | 6/1972 | Miller et al. | 503/220 |
| 3,732,120 | 5/1973 | Brockett et al. | 503/210 |
| 3,737,410 | 6/1973 | Mueller | 525/504 |
| 3,900,216 | 8/1975 | Hayashi et al. | 503/225 |
| 3,928,702 | 12/1975 | Matsukawa et al. | 428/323 |
| 3,963,852 | 6/1976 | Baxter | 428/325 |
| 4,020,261 | 4/1977 | Oda et al. | 428/325 |
| 4,022,735 | 5/1977 | Thompson | 503/225 |
| 4,109,049 | 8/1978 | Thompson | 428/311 |
| 4,173,684 | 11/1979 | Stolfo | 428/531 |
| 4,226,962 | 10/1980 | Stolfo | 525/506 |
| 4,399,209 | 8/1983 | Sanders et al. | 430/138 |
| 4,405,371 | 9/1983 | Sugahara et al. | 106/31.17 |
| 4,446,174 | 5/1984 | Maekawa et al. | 426/261 |
| 4,461,496 | 7/1984 | Ludwig | 346/210 |
| 4,474,847 | 10/1984 | Schroder et al. | 428/323 |
| 4,647,952 | 3/1987 | Pokora et al. | 346/210 |
| 4,742,041 | 5/1988 | Ikeda et al. | 503/200 |
| 4,952,278 | 8/1990 | Gregory et al. | 162/141 |
| 5,061,346 | 10/1991 | Taggart et al. | 162/175 |
| 5,254,522 | 10/1993 | Zink et al. | 503/217 |
| 5,288,687 | 2/1994 | Murakami et al. | 503/214 |
| 5,302,439 | 4/1994 | Malhotra et al. | 428/195 |
| 5,350,729 | 9/1994 | Londo et al. | 503/225 |
| 5,372,884 | 12/1994 | Abe et al. | 428/331 |
| 5,407,892 | 4/1995 | Murakami et al. | 503/209 |
| 5,500,668 | 3/1996 | Malhotra et al. | 347/105 |

OTHER PUBLICATIONS

Pulp and Paper Manufacture, Third Edition, "Coating, Converting, and Specialty Processes", vol. 8, M. Kouris & M. Kocurek, Eds., pp.55–62, no date available.

*Primary Examiner*—Helene Klemanski

*Attorney, Agent, or Firm*—Finnegan Henderson Farabow Garrett & Dunner

[57] ABSTRACT

Coating compositions for ink jet printing, more specifically for the CB, CF and/or CFB sheets in carbonless copy paper. The compositions include a bivalent metal salt of a $C_{12}$ to $C_{24}$ alkyl acid, such as calcium stearate or zinc stearate, which has been found to significantly improve ink jet print quality.

36 Claims, No Drawings

COATING COMPOSITION FOR INK JET PRINTING

BACKGROUND OF THE INVENTION

1. Field of the Invention

The present invention relates to coating compositions for ink jet printing. Specifically, the invention relates to coating compositions for the CB, CF and/or CFB sheets in carbonless copying systems.

2. Description of Related Art

Standard carbonless copying systems or pressure sensitive copying paper include a plurality of substrates, e.g., paper sheets, arranged in a manifold, each sheet having one or more coatings on a surface thereof. The manifold is designed so that when external pressure caused by a printer, pen, or other instrument is applied to the outermost sheet, a colored image will be formed on at least one surface of each sheet of the manifold.

The top sheet of the manifold to which the pressure is applied has a coating on its back surface. This coated back surface typically includes microcapsules containing an initially colorless chemically reactive color-forming dye precursor dissolved in a carrier solvent as the fill material. The front surface of the next sheet, which is adjacent to the back surface of the top sheet, is coated with a material containing a component, such as a phenolic resin or reactive clay, that is capable of reacting with the colorless dye precursor contained in the microcapsules to produce a color. Thus, an external pressure on the front surface of the top sheet will rupture the microcapsules on the back surface and release the colorless dye precursor which then chemically reacts with the reactive component of the coated front of the adjacent sheet to produce a colored image corresponding to the area of pressure. Similarly, colored images are produced on each successive sheet of the manifold by the external pressure rupturing the microcapsules carried on the bottom surface of each sheet.

The sheets of the carbonless copying system manifold are designated in the art by the terms CB for "coated back," CFB for "coated front and back," and CF for "coated front." The CB or transfer sheet is usually the top sheet of the manifold and the sheet to which the external pressure is applied. The CFB sheets are the intermediate sheets of the manifold, each of which is able to have an image formed on its front surface by a pressure, and each of which also transmits the contents of ruptured microcapsules from its back surface to the front surface of the next sheet. The CF or recording sheet is the bottom sheet and is coated only on its front surface so that an image can be formed on it.

There are many applications where it is desirable to print on carbonless copy paper forms by ink jet printing. For example, for many applications such as transportation waybills, muting documents, labels, and the like, it is desirable to produce variable imaging, such as bar codes, on carbonless papers. However, the use of ink jet printing on carbonless forms has resulted in poor scannability of bar codes. The present inventors found that the cause of this poor scannability was ink jet ink diffusion in the coating layer or layers resulting in poor edge definition of the image.

Thus, the need exists for a coating composition that enables ink jet printing to be carried out without loss of image definition, particularly with carbonless copy paper. A more particular need exists for a coating composition that enables ink jet printing of bar code imaging onto carbonless copy paper and overcomes problems of poor scannability.

The present invention satisfies that need by including a hydrated alumina together with a bivalent metal salt of a $C_{12}$ to $C_{24}$ alkyl acid, such as calcium or zinc stearate, into a coating composition on the top side of a CB sheet and/or the developer composition on the CFB or CF sheet. The presence of the hydrated alumina and the bivalent metal salt of a $C_{12}$ to $C_{24}$ alkyl acid, such as calcium or zinc stearate, has been found to significantly improve ink jet print quality.

Additional features and advantages of the invention will be set forth in the written description that follows, and in part will be apparent from the written description or may be learned from the practice of the invention. The advantages of the invention will be realized and attained by the ink jet printable coating composition and/or the developer composition particularly pointed out in the written description and claims herein.

SUMMARY OF THE INVENTION

To achieve these and other advantages, and in accordance with the purpose of the invention as embodied and broadly described herein, the present invention, in one aspect, provides an ink jet printable coating composition including a structured clay; a hydrated alumina; a binder; and a bivalent metal salt of a $C_{12}$ to $C_{24}$ alkyl acid. The bivalent metal salt of a $C_{12}$ to $C_{24}$ alkyl acid is preferably a calcium or zinc stearate.

The present invention, in another aspect, provides a developer composition including a structured clay; a developer resin; a hydrated alumina; a binder; and a bivalent metal salt of a $C_{12}$ to $C_{24}$ alkyl acid. The bivalent metal salt of a $C_{12}$ to $C_{24}$ alkyl acid is preferably a calcium or zinc stearate.

The present invention, in a further aspect, provides carbonless copy paper including a CB sheet having front and back sides and including the ink jet printable coating composition of the invention on its front side. The carbonless paper also includes a CF sheet having front and back sides and including the developer composition of the invention on its front side. The carbonless copy paper may also optionally include at least one CFB sheet having front and back sides and including the developer composition of the invention on its front side.

Although the invention is described as embodied in carbonless copy paper, the invention as broadly claimed is not so limited and its benefits and advantages may apply equally to other coated substrates. The above and other advantages and features of this invention will become apparent upon review of the following specification.

DETAILED DESCRIPTION OF THE PREFERRED EMBODIMENTS

The present invention, as embodied and broadly described herein, provides an ink jet printable coating composition. The composition is preferably coated on the front portion, or "topsheet" of the CB sheet in a carbonless copy paper manifold. The composition includes a structured clay, a hydrated alumina, a binder, and a bivalent metal salt of a $C_{12}$ to $C_{24}$ alkyl acid. The presence of the bivalent metal salt of a $C_{12}$ to $C_{24}$ alkyl acid, in combination with the other components of the composition, improves the definition of images created by ink jet printing. The bivalent metal salt of a $C_{12}$ to $C_{24}$ alkyl acid is preferably calcium or zinc stearate, and is preferably present in an amount of up to about 5 parts based on the total weight of solids in the composition. More preferably, the calcium or zinc stearate is present in an amount ranging from about 0.3 to about 1.2 parts based on the total weight of solids in the composition.

Although not wishing to be bound by any particular theory of the invention, the present inventors believe that the calcium or zinc stearate (or other bivalent metal salt of a $C_{12}$ to $C_{24}$ alkyl acid) enhances ink jet image definition by decreasing ink diffusion in the coating. Poor ink jet imaging in carbonless copy paper is believed to be caused by excessive diffusibility of the ink in the coating structure. Ink diffusion can be decreased by changing the capillary pore structure of the coating, by changing the surface energy of the coating components and overall composition, or both. With aqueous based inks, which are of moderately high surface tension, diffusibility can be decreased by decreasing the surface energy of the coating. Lower surface energy increases repulsive effects of the coating towards the ink, thus limiting diffusion. The presence of the calcium or zinc stearate in the composition of the invention acts to lower the surface energy of the coating, thereby limiting diffusion and improving image definition.

In accordance with the invention, as embodied and broadly described herein, the ink jet printable coating composition of the invention also includes a hydrated alumina. The hydrated alumina, in combination with the bivalent metal salt of a $C_{12}$ to $C_{24}$ alkyl acid and the other components of the composition of the invention, further contributes to improving the definition of images created by ink jet printing. The hydrated alumina is preferably present in an amount ranging from about 5 to about 75 parts, and more preferably about 20 to about 60 parts based on the total weight of solids in the composition.

The present inventors believe that the presence of hydrated alumina enhances ink jet pdnting quality due to the high surface area of the pigment and its small particle size, i.e., on the order of 0.9 to 1.1 micrometers median particle size, with about 50% less than 1 micrometer. The hydrated alumina used in the present invention can be, for example, MARTIFIN OLQ-107, available from Pluess-Staufer International, Inc., Germany.

In accordance with the invention, as embodied and broadly described herein, the ink jet printable coating composition of the invention also includes a structured clay. The structured clay is preferably a chemically structured kaolin clay, such as EXSILON, available from Englehard, McIntyre, Ga., which has a void volume greater than about 50%. The structured clay is preferably present in an amount ranging from about 5 to about 70 parts, and more preferably about 25 to about 65 parts, based on the total weight of solids in the composition.

In accordance with the invention, as embodied and broadly described herein, the ink jet printable coating composition of the invention also includes a binder. The binder can be any binder known in the coated paper art, such as styrene/butadiene latex polymers, acrylic latex polymers or polyvinyl alcohol, but is preferably a starch or modified starch, such as, for example, PENFORD GUM 380, available from Penick & Ford, Cedar Rapids, Iowa. The binder is preferably present in an amount ranging from about 5 to about 20 parts based on the total weight of solids in the composition.

In accordance with the invention, as embodied and broadly described herein, the ink jet printable coating composition of the invention may also optionally include a dispersant and viscosity stabilizer (such as COLLOID 230 available from Rhone-Poulenc, Marietta, Ga., ammonium hydroxide (such as Ammonium Hydroxide 26 Be available from any major chemical supplier), a (biocide) preservative (such as NALCO 7649 available from Nalco Chemical, Naperville, Ill.), a slurry defoamer (such as Dow "B" Emulsion available from Dow Corning of Midland, Mich.), and a fluorescent whitening agent (such as Tinopal PT LQ CNTR available from Ciba Geigy, Greensboro, N.C.

In accordance with another embodiment of the invention, as embodied and broadly described herein, a developer composition is provided. The developer composition includes the aforementioned structured clay, hydrated alumina, binder, and bivalent metal salt of a $C_{12}$ to $C_{24}$ alkyl acid, and additionally includes a developer resin. The developer composition is preferably coated onto the front of the CF sheet or CFB sheet in a carbonless copy paper manifold. The developer composition provides the same benefits of improved ink jet image definition as earlier described herein with respect to the CB topcoat composition.

In accordance with this embodiment of the invention, as embodied and broadly described herein, the bivalent metal salt of a $C_{12}$ to $C_{24}$ alkyl acid in the developer composition is preferably calcium or zinc stearate, and is preferably present in an amount of up to about 5 parts based on the total weight of solids in the composition. More preferably, the calcium or zinc stearate is present in an amount ranging from about 0.3 to about 1.2 parts based on the total weight of solids in the composition. The hydrated alumina in the developer composition is preferably present in an amount ranging from about 5 to about 75 parts, and more preferably about 25 to about 55 parts based on the total weight of solids in the composition. The structured clay in the developer composition is preferably present in an amount ranging from about 5 to about 70 parts, and more preferably about 15 to about 45 parts, based on the total weight of solids in the composition. The binder in the developer composition is preferably starch and is preferably present in an amount ranging from about 5 to about 20 parts based on the total weight of solids in the composition.

In accordance with this embodiment of the invention, as embodied and broadly described herein, the developer resin can be any developer resin known for use in the CF layer of a carbonless copy system. Preferably, the developer resin in the invention is HRJ-2456 resin, a zincated alkylphenol novolac resin dispersion manufactured by Schenectady International, Inc. of Schenectady, N.Y. The developer resin is preferably present in the composition in an amount of up to about 18 parts based on the total weight of solids in the composition.

In accordance with this embodiment of the invention, as embodied and broadly described herein, the developer composition of the invention may also optionally include a dispersant and viscosity stabilizer (such as COLLOID 230 available from Rhone-Poulenc, Marietta, Ga., ammonium hydroxide (such as Ammonium Hydroxide 26 Be available from any major chemical supplier), a (biocide) preservative (such as NALCO 7649 available from Nalco Chemical, Naperville, Ill.), a slurry defoamer (such as Dow "B" Emulsion available from Dow Corning of Midland, Mich.), and a fluorescent whitening agent (such as Tinopal PT LQ CNTR available from Ciba Geigy, Greensboro, N.C.

The coating formulations of the invention can be made using procedures known to those skilled in the art. Pigments, if not purchased as dispersed slurries, can be dispersed in water and dispersant at concentrations high enough to give adequate dispersion. The pigment slurries are then preferably blended together, and the pH adjusted with ammonia so that the final coating mixture will have a pH of preferably between 7.5 and 8.5. If necessary, resin can then be blended into the mixture. Starch binder is prepared using procedures well known to those skilled in the art by heating in a heated vessel until sufficiently hydrated to give proper binding properties. The binder is then preferably blended into the mixture, followed by additions of stearate and fluorescent whitening agent. At each step, dilution water sufficient for proper mixing can be added to result in a total solids concentration for the desired final consistency.

The coating mixtures of the invention can be applied to the base paper sheet using coating equipment of the type generally used in the paper coating industry, such as a paper machine size press, or on machine and off machine coaters of various types and configurations. Adjustments in final solids concentration and rheological properties may be required for different coater types. More specifically, the coating mixture can be applied using a flexographic coater consisting of an Anilox roll and a transfer roll to apply the coating to the paper surface, which can be provided with a backing roll opposing the transfer roll. The coated paper sheet can then be dried in any appropriate drying system, such as an air flotation dryer.

The coating weights in accordance with the invention are preferably about 0.5 to about 2.0 lbs./ream, more preferably about 0.8 to about 1.5 lbs./ream, for the CB coating, and preferably about 0.8 to about 2.0 lbs./ream, more preferably about 1.2 to about 1.7 lbs./ream, for the CF developer coating.

The following examples are illustrative only and are not intended to limit the invention.

EXAMPLE 1

The following composition was coated onto the front surface of the CB sheet in a carbonless copy paper manifold.

TOP COAT FORMULA FOR CB

| Material | Dry % | Wet % |
|---|---|---|
| Exsilon Slurry | 55.57 | 39.69 |
| Martifin | 29.91 | 26.92 |
| Water | 0.00 | 9.79 |
| Colloid 230 | 0.85 | 0.88 |
| PG-380 Starch | 12.82 | 20.60 |
| Calsan 50 | 0.85 | 0.77 |
| Tinopal PT | 0.00 | 1.35 |
| | 100.00 | 00.00 |

Exsilon Purchased and Used at 63% Solids
Martifin Made Down at 50% Solids
Starch Made Down at 28% Solids
Coat Weight of 1.00 Lb./Ream (Dry) Applied
Calsan 50 is calcium stearate, available from PPG Industries, Appleton, WI This composition enables bar code images to be printed by ink jet printing onto carbonless copy paper with excellent image definition. This improved image definition has virtually eliminated prior problems with bar code scannability.

EXAMPLE 2

The following composition was coated onto the front surface of the CF and CFB sheets in a carbonless copy paper manifold.

RESIN CF FORMULA

| Material | Dry % | Wet % |
|---|---|---|
| Martifin | 46.56 | 37.25 |
| Exsilon | 25.40 | 19.35 |
| Water | 0.00 | 6.30 |
| Colloid 230 | 1.29 | 1.42 |
| Ammonia 26 Be | 0.00 | 0.24 |
| HRJ-2456 Resin | 13.88 | 12.57 |
| PG-380 Starch | 12.02 | 20.60 |
| Calsan 50 | 0.85 | 0.82 |
| Tinopal PT | 0.00 | 1.44 |
| | 100.00 | 100.00 |

Martifin is Made Down at 50% Solids
Exsilon Purchased and Used at 63% Solids
Starch Made Down at 28% Solids
Coat Weight of 1.50 Lb./Ream (Dry) Applied
Calsan 50 is calcium stearate, available from PPG Industries, Appleton, WI This composition enables bar code images to be printed by ink jet printing onto carbonless copy paper with excellent image definition. This improved image definition has virtually eliminated prior problems with bar code scannability.

It will be apparent to those skilled in the art that various modifications and variations can be made in the ink jet printable coating composition and the developer composition of the invention without departing from the spirit or scope of the invention. Thus, it is intended that the present invention cover modifications and variations of this invention provided that they come within the scope of the appended claims and their equivalents.

What is claimed is:

1. An ink jet printable coating composition comprising:
a structured clay;
a hydrated alumina;
a binder; and
a bivalent metal salt of a $C_{12}$ to $C_{24}$ alkyl acid.

2. The composition of claim 1, wherein said alkyl acid is a stearate.

3. The composition of claim 1, wherein said bivalent metal salt of a $C_{12}$ to $C_{24}$ alkyl acid is calcium stearate.

4. The composition of claim 1, wherein said bivalent metal salt of a $C_{12}$ to $C_{24}$ alkyl acid is zinc stearate.

5. The composition of claim 1, wherein said binder is starch.

6. The composition of claim 1, wherein said structured clay is chemically structured kaolin clay.

7. The composition of claim 1, wherein said structured clay is present in an amount ranging from about 5 to about 70 parts based on the total weight of solids in the composition.

8. The composition of claim 1, wherein said structured clay is present in an amount ranging from about 25 to about 65 parts based on the total weight of solids in the composition.

9. The composition of claim 1, wherein said hydrated alumina is present in an amount ranging from about 5 to about 75 parts based on the total weight of solids in the composition.

10. The composition of claim 1, wherein said hydrated alumina is present in an amount ranging from about 20 to about 60 parts based on the total weight of solids in the composition.

11. The composition of claim 1, wherein said binder is present in an amount ranging from about 5 to about 20 parts based on the total weight of solids in the composition.

12. The composition of claim 2, wherein said stearate is present in an amount of up to about 5 parts based on the total weight of solids in the composition.

13. The composition of claim 12, wherein said stearate is present in an amount ranging from about 0.3 to about 1.2 parts based on the total weight of solids in the composition.

14. The composition of claim 1, further comprising a dispersant.

15. The composition of claim 1, wherein said composition is coated onto the exposed surface of the CB sheet in a carbonless copy manifold.

16. The composition of claim 15, wherein said composition is present in a coating weight ranging from about 0.5 to about 2.0 lbs./ream.

17. A developer composition comprising:

a structured clay;

a developer resin;

a hydrated alumina;

a binder; and a bivalent metal salt of a $C_{12}$ to $C_{24}$ alkyl acid.

18. The composition of claim 17, wherein said alkyl acid is a stearate.

19. The composition of claim 18, wherein said bivalent metal salt of a $C_{12}$ to $C_{24}$ alkyl acid is calcium stearate.

20. The composition of claim 18, wherein said bivalent metal salt of a $C_{12}$ to $C_{24}$ alkyl acid is zinc stearate.

21. The composition of claim 17, wherein said binder is starch.

22. The composition of claim 17, wherein said structured clay is chemically structured kaolin clay.

23. The composition of claim 17, wherein said developer resin is a zincated alkylphenol novolac resin dispersion.

24. The composition of claim 17, wherein said structured clay is present in an amount ranging from about 5 to about 70 parts based on the total weight of solids in the composition.

25. The composition of claim 24, wherein said structured clay is present in an amount ranging from about 15 to about 45 parts based on the total weight of solids in the composition.

26. The composition of claim 17, wherein said hydrated alumina is present in an amount ranging from about 5 to about 75 parts based on the total weight of solids in the composition.

27. The composition of claim 26, wherein said hydrated alumina is present in an amount ranging from about 25 to about 55 parts based on the total weight of solids in the composition.

28. The composition of claim 17, wherein said binder is present in an amount ranging from about 5 to about 20 parts based on the total weight of solids in the composition.

29. The composition of claim 17, wherein said stearate is present in an amount of up to about 5 parts based on the total weight of solids in the composition.

30. The composition of claim 29, wherein said stearate is present in an amount ranging from about 0.3 to about 1.2 parts based on the total weight of solids in the composition.

31. The composition of claim 17, wherein said developer resin is present in an amount of up to about 18 parts based on the total weight of solids in the composition.

32. The composition of claim 17, further comprising a dispersant.

33. The composition of claim 17, wherein said developer composition is the CF coating in carbonless copy paper.

34. The composition of claim 33, wherein said composition is present in a coating weight ranging from about 0.8 to about 2.0 lbs./ream.

35. Carbonless copy paper comprising:

a CB sheet having front and back sides, including the composition of claim 1 coated onto its front side; and a CF sheet having front and back sides, including the composition of claim 17 coated onto its front side.

36. The carbonless copy paper of claim 35, further comprising at least one CFB sheet having front and back sides, including the composition of claim 17 coated onto its front side.

* * * * *

UNITED STATES PATENT AND TRADEMARK OFFICE

CERTIFICATE OF CORRECTION

PATENT NO. : 5,709,738

DATED : January 20, 1998

INVENTOR(S) : Cronlund, et al

It is certified that error appears in the above-identified patent and that said Letters Patent is hereby corrected as shown below:

On the title page;

--[73] Assignee: Moore Business Forms, Inc., Grand Island, New York--

Signed and Sealed this

Twentieth Day of October, 1998

Attest:

BRUCE LEHMAN

*Attesting Officer* *Commissioner of Patents and Trademarks*